US005583329A

United States Patent [19]

Davis, III et al.

[11] Patent Number: 5,583,329

[45] Date of Patent: Dec. 10, 1996

[54] DIRECT RECORDING ELECTRONIC VOTING MACHINE AND VOTING PROCESS

[75] Inventors: John M. Davis, III, Midlothian; Shelby Thomas, Urbanna, both of Va.

[73] Assignees: Election Products, Inc., Glen Allen; ILT Corp., Midlothian, both of Va.

[21] Appl. No.: 283,860

[22] Filed: Aug. 1, 1994

[51] Int. Cl.[6] .......................... G07C 13/00; G06F 17/60

[52] U.S. Cl. ........................ 235/50 A; 235/386; 395/212

[58] Field of Search .............................. 235/50 R, 50 A, 235/50 B, 51, 56, 386; 364/409

[56] References Cited

U.S. PATENT DOCUMENTS 5,189,288 2/1993 Anno et al. ............................ 364/409

5,377,099 12/1994 Miyagawa .............................. 364/409

*Primary Examiner*—Cassandra C. Spyrou

*Attorney, Agent, or Firm*—Foley & Lardner

[57] ABSTRACT

An electronic election system is described, which includes a voting terminal having a first processor for processing voter selection data, a terminal memory for storing election data, and a first transceiver for transmitting first and second control signals and for receiving the election data; and a memory cartridge having a second processor, a memory for storing election data and security data, and a second transceiver for receiving the first and second control signals and for transmitting the election data. The second processor is responsive to the first control signal for controlling the second transceiver to transmit security data activating the voting terminal for receiving voter selection input data when the security data authorizes activation of the voting terminal and to transmit the election data stored in the second memory, and is responsive to the second control signal after the election data is transmitted for storing security data for deactivating the voting terminal from receiving voter selection input data.

11 Claims, 2 Drawing Sheets

DIRECT RECORDING ELECTRONIC VOTING MACHINE AND VOTING PROCESS

BACKGROUND OF THE INVENTION

1. Field of the Invention

The present invention relates to voting systems. More particularly, the present invention relates to a memory cartridge for use with a direct recording electronic (DRE) voting machine and a method for using a memory cartridge to define the operation of a DRE voting machine independently for individual voters.

2. Description of the Related Art Many computer-based voting systems are known which improve upon mechanical voting machines which retain vote tallies cast for candidates or referendums. These known computer-based voting systems provide the advantage of conveniently programmed voting machines which simplify pre-election procedures prior to an election, and which maintain a reliable running tally of votes during the election.

Several known systems utilize a memory cartridge for configuring voting machines and for storing election results. For example, U.S. Pat. No. 4,641,241 to Boram discloses a memory cartridge used in an electronic voting system. The Boram memory cartridge supplies data for setting up a programmable voting machine from an election headquarters computer. The memory cartridge includes three read only memories, two of which are electrically erasable read only memories (EEPROM) and a third which is a non-electrically erasable read only memory (EPROM). Prior to the election, information is stored in the memory cartridge which associates particular switches of an array of switches on the voting machine with particular candidates or referendums so that the switches correspond to a paper ballot affixed to the voting machine. The cartridge is then inserted into the voting machine for setting up the voting machine. During the election, the memory cartridge remains inserted in the voting machine and is enabled for storing running totals of votes cast for each candidate or referendum. At the end of the election, the running total of votes is permanently stored in the EPROM of the memory cartridge. The cartridge is then removed from the voting machine and transported to the election headquarters for totalling the results together with totals permanently stored in memory cartridges from other voting machines. While the Boram memory cartridge provides security for election tally integrity, the cartridge does not prevent a voter from voting twice. Also, the card does not contain data for configuring a voting machine with election data specific for a particular voter.

U.S. Pat. No. 5,189,288 to Anno et al. discloses an electronic voting terminal which receives a voting card having a printed bar code with data for controlling the presentation of names or issues to each voter. The bar code does not identify each voter specifically, but authorizes the vote to be tabulated, and provides an indication to the voting terminal as to what language the terminal will be operative in. After voting, the individual's voting selections are recorded on the voting card and the voting card is rendered incapable of further use by the voter by a mark which is printed on the card by the terminal.

The card is returned to the voter and the voter then inserts the used voting card in a data urn so that a hard copy of the ballot is retained for recount purposes. While the Anno et al. card prevents a voter from voting twice, the card does not contain data for configuring a voting machine with election data specific for a particular voter, nor is the card reusable by another voter.

SUMMARY OF THE INVENTION

The present invention provides an electronic election system which includes a voting terminal having an input device for receiving voter selection data, a first processor for processing voter selection data, a terminal memory for storing election data, and a first transceiver for transmitting first and second control signals and for receiving the election data, and a memory cartridge having a second processor, a memory for storing election data and security data, and a second transceiver for receiving the first and second control signals and for transmitting the election data, wherein the voting terminal has a receptacle for receiving the memory cartridge and the second processor is responsive to the first control signal for controlling the second transceiver for transmitting security data activating the voting terminal for receiving voter selection input data and for transmitting the election data stored in the cartridge memory when the security data authorizes activation of the voting terminal, and is responsive to the second control signal after the election data is transmitted to the voting terminal for storing security data for deactivating the voting terminal from receiving voter selection input data. Preferably, the election data stored in the cartridge memory includes ballot information, and the first and second transceivers are electrically isolated from each other, and communicate by optical means.

The present invention also provides a supervisor terminal having a receptacle for receiving the cartridge memory wherein the supervisor terminal produces a third control signal which causes the second processor to control the second transceiver for receiving election data (e.g. the ballot information) and security data for activating the voting terminal for receiving voter input selection data. The second transceiver generates another control signal to which the supervisor terminal is responsive for receiving the election data to be stored in the cartridge memory.

According to the invention, the second transceiver transmits a fourth control signal, and the first processor is responsive to the fourth control signal for controlling the first transceiver for transmitting election data stored in the terminal memory, wherein the election data comprises election result data. The second processor is responsive to the election result data and stores the election result data in the cartridge memory. The supervisor terminal generates a fifth control signal which causes the second processor to control the second transceiver for transmitting the stored election result data, so the supervisor terminal can store the election result data.

The present invention also provides a method for controlling activation of a voting terminal including the steps of storing election data and voting terminal activation data in a memory in a cartridge, inserting the cartridge into a receptacle in the voting terminal, generating a first control signal at the voting terminal in response to the cartridge being inserted into the receptacle, activating the voting terminal to receive voter selection data in response to the first control signal if the voting terminal activation data indicates that the voting terminal is to be activated, generating a second control signal at the voting terminal when a voter selection data is cast, changing the voting terminal activation data in the first memory to indicate that the voting terminal is to be deactivated in response to the second control signal, and deactivating the voting terminal to not receive voter selection data.

According to the invention, a further control signal is generated at a supervisor terminal and, in response, the voting terminal activation data in the first memory is changed to indicate that the voting terminal is to be activated. A further control signal is generated at the cartridge, causing election result data stored in a second memory of the voting terminal to be transmitted to the cartridge, and election result data is then stored in the first memory. Another control signal is generated at the supervisor terminal memory, causing election result data stored in the first memory to be transmitted to the supervisor memory, and the election result data is then stored in the supervisor memory.

BRIEF DESCRIPTION OF THE DRAWINGS

The various objects and features of the present invention, together with other advantages and benefits which may be attained by its use, will become more apparent in view of the following detailed description of the invention taken in conjunction with the drawings. In the drawings, wherein like reference numerals identify corresponding portions of the various embodiments of the DRE voting system according to the present invention.

DETAILED DESCRIPTION OF THE PREFERRED EMBODIMENTS

Figure 1:
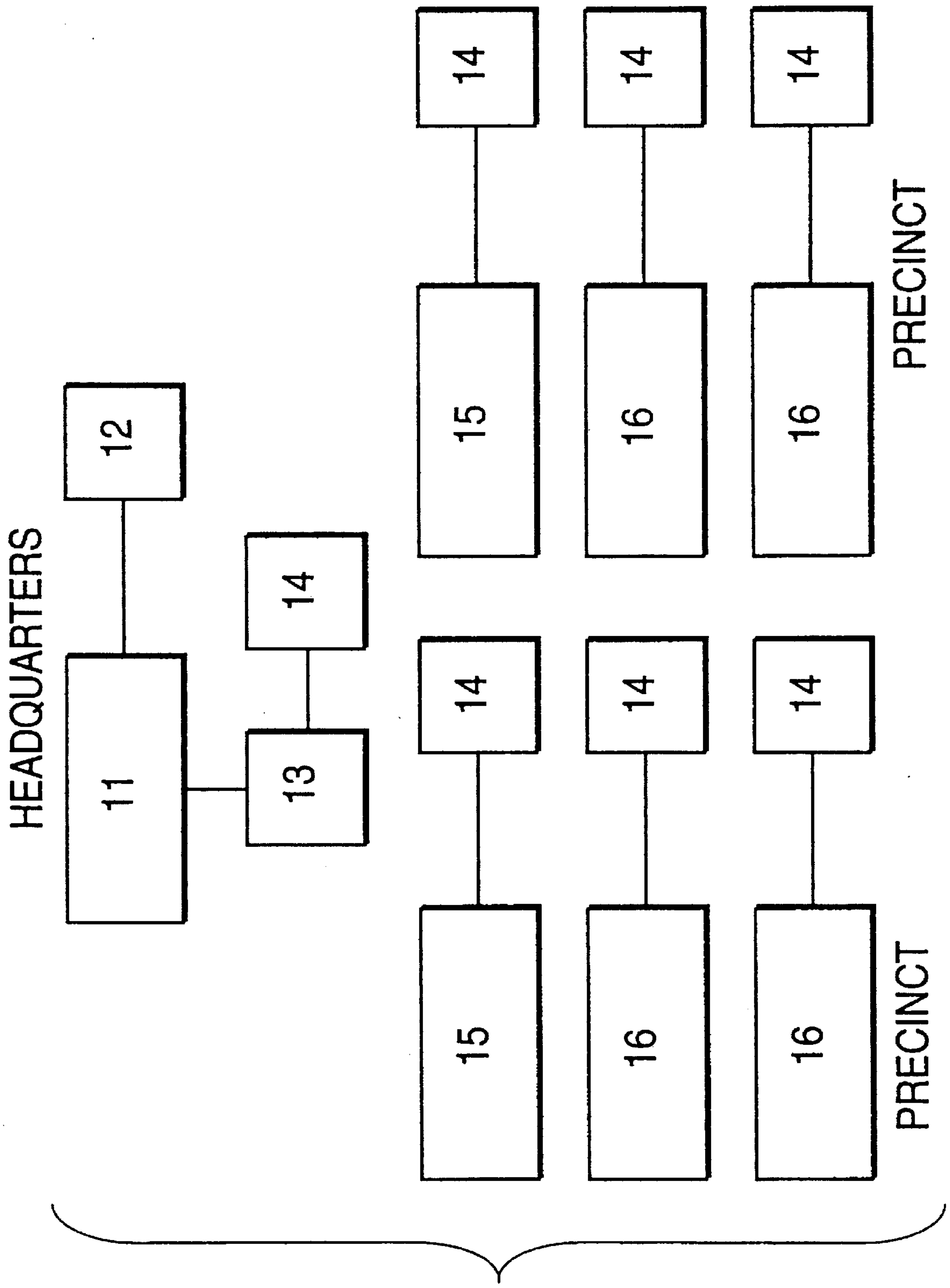
FIG.1 depicts a voting system according to the present invention.

FIG. 1 depicts a voting system according to the present invention. A central computer 11 located at an election headquarters includes a central election database 12 comprising voter registration lists, candidate lists, referendum information, ballot configuration, etc. A terminal 13 is connected to computer 11 so that selected information from the central election data base can be stored, to be transferred to a personalized electronic ballot 14. PEB 14 has an internal memory which can be configured for storing election data and election results data depending on the particular function the PEB serves within election system.

Each individual voting location (e.g. a voting precinct) includes a supervisor terminal 15 and at least one direct recording electronic (DRE) voting terminal 16. Voting terminal 16 includes a PEB reader/writer for reading and writing information to a PEB. Voting terminal 16 is a generic voting machine which can be programmed with election data for a particular voter location by information stored in a PEB which is inserted into the reader/writer of the voting machine. Since voting terminal 16 is configured by election data stored in a PEB, voting terminal 16 stands alone and is not connected to supervisor terminal 15.

Generally, election data is formulated at the election headquarters prior to an election using central election database 12 to configure different voter ballot types which will be used at each different voting location. That is, ballot data, such as the candidates and/or referendum issues which will appear on the ballots for a particular voting location, are generated. The election data is then stored on a special PEB, known as a supervisor PEB, which is designated for the particular voting location and is used for transporting the election data between computer 11 and supervisor terminal 15. A supervisor PEB contains ballot information which is specific to the particular voting location. Each voting terminal is also qualification checked for functionality prior to the election. With other technologies, each PEB machine would have to be completely tested with each of its ballots and all voting combinations in accordance with Federal Election Commission (FEC) requirements. The present supervisor and voting terminals and voter PEB can be tested generically, since the machines contain no ballot information when shipped to the individual voting location. Of course, the machines can be shipped to and from the individual voting locations in appropriate containers to provide the necessary security and protection from damage.

The supervisor PEBs for a particular voting location can be configured with ballot data and an activation securing code at the election headquarters prior to transport to the voting location. At each voting location, a supervisor PEB is inserted into supervisor terminal 15 at its designated voting location so that the election data can be transferred to supervisor terminal 15.

During the election, a voter is authorized to vote by an appropriate election official. A voter PEB is then programmed by the supervisor terminal 15 to contain an activation security code, and is loaded with specific ballot data for the voter. A PEB programmed with ballot data and an activation security code is given to the authorized voter and the voter proceeds to the any available voting terminal 16 and inserts the PEB into the PEB reader/writer of the voting machine. The voting terminal displays a ballot based on the ballot data programmed into the memory of the PEB. The voter then selects candidates and/or positions on referendums and casts the ballot. The voting terminal tallies each selection of the voter in an internal memory of the voting terminal and writes a deactivation security code into the memory of the PEB so that particular PEB cannot be used again for voting until it is again reactivated. After voting, the voter returns the PEB to a PEB collection box or location. Periodically, or as needed, an election official retrieves the used PEBs from the collection box and reactivates them using supervisor terminal 15 by storing an activation security code or by clearing the deactivation security code, depending upon the exact technique used for activating and deactivating the PEBs. Once reactivated, the PEBs can be reused by subsequent voters.

After the election is over, an election official inserts a specially programmed supervisor PEB into each voting terminal to transfer the vote tally stored within the voting terminal to the memory of the special supervisor PEB. The combined vote tally of all voting machines at the voting location is then tallied in supervisor terminal 15 and stored in a supervisor PEB for transport to the election headquarters for reporting the results of that particular voting location. The voting terminals are then also returned to the election headquarters with their respective vote tallies stored in their internal memories.

Figure 2:
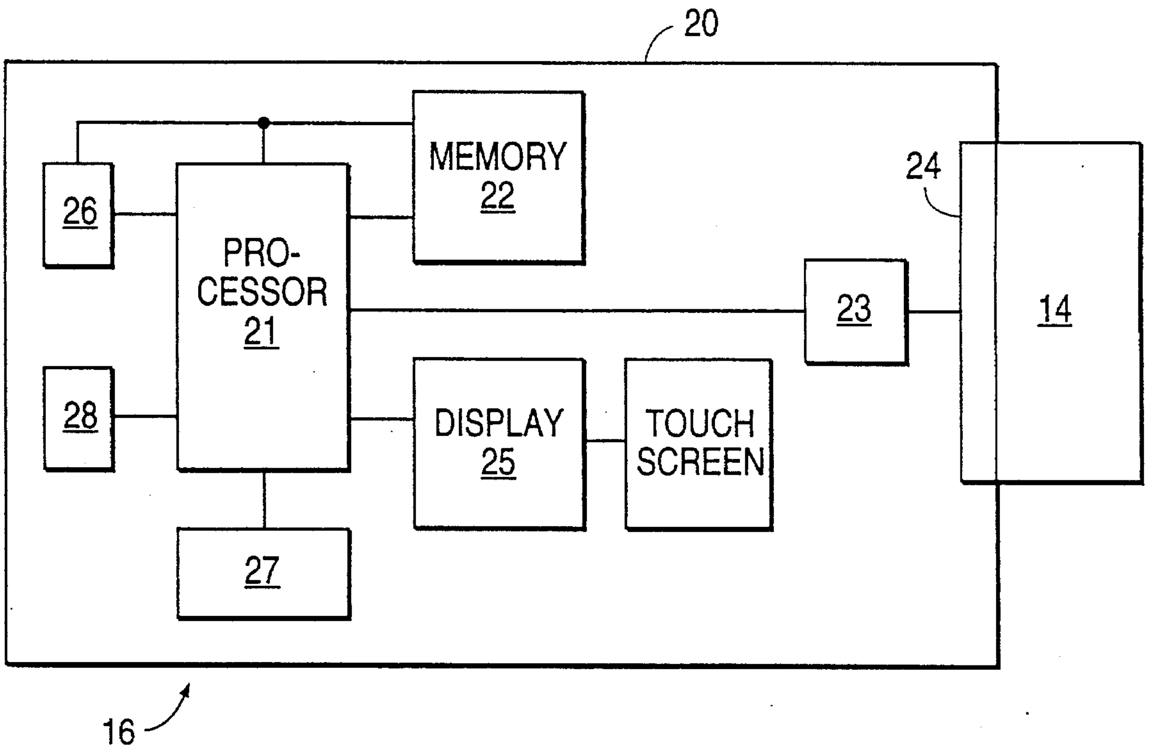
FIG. 2 shows a schematic block diagram of supervisor/voting terminal according to the present invention.

FIG. 2 shows a schematic block diagram of voting terminal 16, in which, according to the invention, a generic voting machine is specifically configured for each voter based on election data contained in a PEB. Voting terminal 16 includes a sealable housing 20, a processor 21, a memory 22, a signal isolator 23, a PEB receptacle 24, a display 25, a battery 26 and, depending on the specific configuration of voting machine 16, vote switch 27. In the case of the supervisor terminal, an input/output (I/O) connector 28 is also provided. Preferably, display 25 is a liquid crystal display (LCD) for displaying ballot information and is preferably configured as a touch screen display so that a voter may select candidates and/or positions on referendums by merely touching appropriate locations on display 25 with either a finger or a computer pen (not shown). Alternatively, if display 25 is not configured as a touch screen display, an array of switches 27 can be included as part of voting machine 16 for allowing input of voter selections. Signal isolator 23 and receptacle 24 together comprise the PEB reader/writer of the PEB.

Processor 21 is coupled to each of memory 22, signal isolator 23, display 25 and voter switch 27. Memory 22 includes a random access memory (RAM) area of sufficient size for storing data, such as election information and vote tallies, and can include a read only memory (ROM) area of sufficient size for storing program data, such as voting terminal diagnostics and input/output drivers for interfacing with a PEB 14 inserted into receptacle 24, with display 25 and with voter switch 27. I/O connector 28 can optionally be included with voting machine 16 for providing additional interfacing capability, such as to a printer or to a computer for system diagnostics.

Preferably, processor 21 is a suitable microprocessor having sufficient processing capability and speed for operating voting machine 16. The RAM area of memory 22 is preferably a low-power static RAM, or equivalent, having sufficient size and operating speed for storing the operating system software of voting machine 16, any temporary system memory requirements, ballot data and vote tallies. Both processor 21 and memory 22 can be configured as a single dedicated integrated circuit having suitable components, or as an application specific integrated circuit (ASIC) designed specifically for the requirements of voting machine 16. Signal isolator 23 is preferably an infrared detector and a light emitting diode (LED) configured as a transceiver for bidirectionally coupling data to and from a PEB.

Battery 26 is connected for powering the various components of voting machine 16. Battery 26 is coupled to memory 22 in compliance with FEC specifications for voting equipment so that vote tally data is reliably retained in memory 22 when voting machine 16 is turned off and transported to the election headquarters. Housing 20 surrounds and protects processor 21, memory 22, signal isolator 23, PEB receptacle 24 and battery 26 and is sealed using well-known techniques for preventing tampering with the internal components.

Display 25 can also be a cathode ray tube (CRT) display configured as a touch screen display located external to housing 20. In such a configuration of voting terminal 16, display 25 is coupled to processor 21 through a dedicated I/O connector (not shown).

Figure 3:
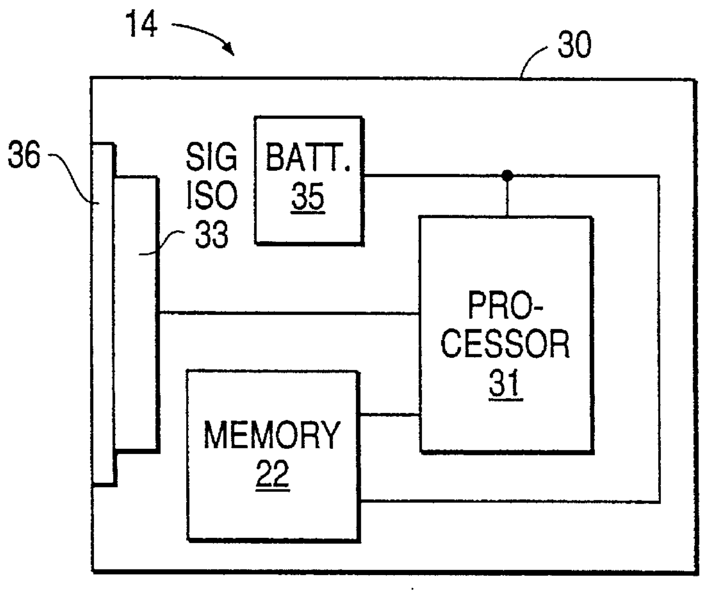
FIG. 3 shows a schematic block diagram of a personalized electronic ballot according to the present invention.

FIG. 3 shows a schematic block diagram of a PEB. According to the invention, a PEB includes a sealed and tamper-resistant housing 30, a processor 31, a memory 32, a signal isolator 33 and a battery 35. Processor 31 is coupled to memory 32 and signal isolator 33. Memory 32 includes a random access memory (RAM) area of sufficient size for storing election data depending upon the specific functions of the PEB, that is, whether the PEB is a supervisor PEB or a voter PEB. Processor 31 is permanently programmed for communication, data integrity management and PEB identification functions. Signal isolator 33 is positioned within housing 30 adjacent to a transparent window 36 so that infrared signals can be transmitted to and received from a signal isolator 23 of a voting machine 16.

Preferably, processor 31 is suitable low-power microprocessor having sufficient processing capability and speed for operating PEB 14. However, processor 31 can be embodied as dedicated logic circuitry which provides the necessary handshaking for communicating with voting machine 16 and the logic for addressing memory 32. The RAM area of memory 32 is preferably a low power non-volatile RAM, such as a static RAM or equivalent, having sufficient size and operating speed for storing, for example, any temporary system memory requirements of PEB 14 and processor 31, ballot data and a security code. Additionally, the RAM area of memory 32 is of sufficiently high enough speed so that inconvenient processing delays associated with reading and writing data to memory 32 are nonexistent. A unique serial number and other identification information are permanently stored in each PEB either in a register within processor 31 or in memory 32. Both processor 31 and memory 32 can be configured as a single dedicated integrated circuit having suitable components or as an ASIC designed specifically for the requirements of PEB 14. Signal isolator 33 is preferably an infrared detector and a LED configured as a transceiver for bidirectionally coupling data to and from a voting machine. Battery 35 is connected for powering the constituent components of PEB 14 and is coupled to memory 32 in compliance with FEC specifications for voting equipment so that when PEB 14 is operated in a power-down mode, vote tally data stored in memory 32 during transport to the election headquarters is reliably retained in memory 32. Preferably, battery 35 is configured as two lithium batteries so that the PEB can retain data for an estimated 6–8 years. Housing 30 surrounds and protects processor 31, memory 32, signal isolator 33 and battery 35 and is sealed using well-known techniques for preventing tampering with the internal components.

During the election, voting terminal 16 detects when PEB 14 is inserted into PEB receptacle 24 using any one of a number of well-known techniques, such as a magnetic actuator switch. In response, processor 21 transmits control signals from signal isolator 23 to PEB 14 for initiating handshaking and data transfer between voting terminal 16 and PEB 14. Preferably, data transfer is done using a serial data technique, however, signal isolators 23 and 33 can be configured for parallel data transmission. When a voter PEB is inserted into receptacle 24, processor 21 transmits a control signal for querying the security code stored in the PEB for determining whether the voting terminal can be activated for casting the voter's ballot. Voting terminal 16 can only be activated for voting by an activation security code stored in a PEB. If the security code stored in PEB 14 permits the voting terminal to be activated, that is, an activation security code, specific ballot data for the voter who inserted the PEB into the voting terminal is transferred from the memory of the PEB to the memory of voting terminal 16. That is, specific data for the voter, such as candidates, referendum issues and the language the ballot is displayed in, is transmitted from PEB 14 to the memory of voting terminal 16 via signal isolators 23 and 33. Processor 21 responds to the ballot data now stored in memory by displaying the specific ballot and configuring touch screen areas of display 25 to correspond to the various selections presented by the ballot.

Processor 31 updates display 25 accordingly as the voter makes selections. When the selections are finalized and the ballot is cast, the processor updates a running tally of ballots cast stored in memory 22 in a random fashion for assuring voter confidentiality. Processor 21 then transmits a control signal to PEB 14 for storing a deactivation security code in memory 32 so that PEB 14 cannot be used by the voter to double vote. PEB 14 is then removed from voting terminal 16 and returned to a PEB collection box. Periodically, or as necessary, an election official retrieves PEBs from the collection box for reactivation. That is, each deactivated PEB is individually inserted into supervisor terminal 15 and an activation security code is cleared or written into the PEB depending upon the particular technique used to effect the activation/deactivation of the PEBs. Reactivated PEBs are then supplied to subsequent voters who proceed to any available voting terminal for casting a ballot.

When the election is over, a supervisor PEB is inserted into each voting terminal 16. The supervisor PEB is configured for retrieving and storing the running vote tally in each voting terminal and for printing the election results of the voting terminal, using a supervisor terminal, its I/O connector 28 and a suitable printer. Each voting terminal continues to store its running tally until it is reconfigured prior to the next election. The supervisor PEB transmits a control signal to voting machine 16 for transferring the running tally to the memory of the PEB. After retrieving the results, the tally data stored in the supervisor PEB can be transferred to supervisor terminal 15. In this manner, the election result data from all of the voting terminals at a voting location can be collected in the supervisor terminal, and if desired, transmitted to the election headquarters via a modem. The supervisor PEBs also could be transported directly to the election headquarters for compilation.

Various modifications of the DRE voting system according to the invention are possible. For example, the isolated signal coupling between voting terminal 16 and PEB 14 could be implemented with direct electrical contacts between the two devices which connect isolation devices in each respective device for providing capacitive, inductive or optical isolation. Additionally, voting terminal 16 can be powered by an AC power supply with battery 26 providing a reliable back-up power supply in the event AC power is unavailable and when the election result data is being retained in memory 22. Further, a portion of the power requirements of a PEB can be supplied via an isolated coupling from a voting terminal 16. Voting terminal 16 according to the invention can also be modified for retrofitting existing DRE voting machines.

Although this description of the invention with reference to the above specified embodiments, the claims and not this description limit the scope of the invention. Various modifications of the disclosed embodiments, as well as alternative embodiments of the invention, will become apparent to persons skill in the art upon reference to the above description. Therefore, the appended claims will cover such modifications that fall within the true scope of the invention.

What is claimed is:

1. An electronic election system comprising:

a voting terminal comprising an input device for receiving voter selection data, a first processor, coupled to the input device, for processing the voter selection data, a terminal memory, coupled to the first processor, for storing election data, and a first transceiver, coupled to the first processor, for transmitting first and second control signals and for receiving the election data; and a personalized electronic ballot comprising a second processor, a memory, coupled to the second processor, for storing the election data and security data, and a second transceiver, coupled to the second processor, for receiving the first and second control signals and for transmitting the election data;

the voting terminal having a receptacle for receiving the personalized electronic ballot;

the second processor being responsive to the first control signal for controlling the second transceiver to transmit the security data activating the voting terminal for receiving the voter selection data and to transmit the election data stored in the personalized electronic ballot's memory when the security data authorizes activation of the voting terminal, and being responsive to the second control signal after the election data is transmitted to the voting terminal for storing the security data for deactivating the voting terminal from receiving the voter selection data.

2. The electronic election system according to claim 1, further comprising a supervisor terminal having a receptacle for receiving the personalized electronic ballot, the supervisor terminal having a third transceiver which produces a third control signal;

wherein, the second processor is responsive to the third control signal for controlling the second transceiver to receive the security data for activating the voting terminal for receiving the voter selection data.

3. The electronic election system according to claim 2, wherein the second transceiver transmits a fourth control signal, and the first processor is responsive to the fourth control signal for controlling the first transceiver for transmitting the election data stored in the terminal memory, the election data comprising election result data from voter selection input; and wherein the second processor is responsive to the election result data for storing the election result data in the personalized electronic ballot's memory.

4. The electronic election system according to claim 3, wherein the third transceiver of the supervisor terminal generates a fifth control signal, and the second processor is responsive to the fifth control signal for controlling the second transceiver to transmit the stored election result data, and wherein the supervisor terminal stores the election result data.

5. The electronic election system according to claim 2, wherein the second transceiver transmits a sixth control signal, and the third transceiver of the supervisor terminal is responsive to the sixth control signal to receive the election data stored in the personalized electronic ballot's memory.

6. The electronic election system according to claim 1, wherein the election data stored in the personalized electronic ballot's memory includes ballot information.

7. The electronic election system according to claim 1, wherein the first and second transceivers are electrically isolated from each other by means of a housing around the personalized electronic ballot when the personalized electronic ballot is inserted into the voting terminal.

8. A method for communicating a voter's selection data to a voting terminal comprising the steps of:

selecting a ballot specific to an individual voter;

storing the ballot and voting terminal activation data in a memory in a personalized electronic ballot;

inserting the personalized electronic ballot into a receptacle in the voting terminal;

generating a first control signal at the voting terminal in response to the personalized electronic ballot being inserted into the receptacle;

activating the voting terminal to receive voter selection data in response to the first control signal if the voting terminal activation data indicates that the voting terminal is to be activated;

changing the voting terminal activation data in the personalized electronic ballot's memory to indicate that the voting terminal is to be deactivated; and deactivating the voting terminal to not receive voter selection data.

9. The method according to claim 8, further comprising the steps of:

generating a second control signal at a supervisor terminal; and changing the voting terminal activation data in the personalized electronic ballot's memory in response to the second control signal to indicate that the voting terminal is to be activated in response to the first control signal.

10. The method according to claim 9, further comprising the steps of:

generating a third control signal at the personalized electronic ballot;

transmitting election result data stored in a memory of the voting terminal to the personalized electronic ballot in response to the third control signal; and storing the election result data in the personalized electronic ballot's memory.

11. The method according to claim 10, further comprising the steps of:

generating a fourth control signal at a supervisor terminal memory;

transmitting the election result data stored in the personalized electronic ballot's memory to the supervisor terminal memory in response to the fourth control signal; and storing the election result data in the supervisor terminal memory.

* * * * *